(12) United States Patent
Spinelli et al.

(10) Patent No.: US 8,087,174 B2
(45) Date of Patent: Jan. 3, 2012

(54) SHAPE MEMORY SAFETY UTENSIL

(75) Inventors: Thomas Spinelli, East Northport, NY (US); Jahangir S. Rastegar, Stony Brook, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 1899 days.

(21) Appl. No.: 10/338,519

(22) Filed: Jan. 8, 2003

(65) Prior Publication Data

US 2003/0126750 A1  Jul. 10, 2003

Related U.S. Application Data

(60) Provisional application No. 60/346,551, filed on Jan. 8, 2002.

(51) Int. Cl.
*A47G 21/04* (2006.01)

(52) U.S. Cl. ............................................. 30/324; 30/141

(58) Field of Classification Search .................. 220/201; 99/338, 342, DIG. 10; 30/DIG. 6, 147–150, 30/322, 345, 324, 141
See application file for complete search history.

(56) References Cited

U.S. PATENT DOCUMENTS

| 4,955,889 | A | * | 9/1990 | Van Gent ...................... 606/107 |
| 5,384,998 | A | * | 1/1995 | Tanaka et al. .................... 52/630 |
| 5,687,995 | A | * | 11/1997 | Mori et al. ................. 285/381.2 |
| 6,159,207 | A | * | 12/2000 | Yoon .............................. 606/41 |
| 6,655,011 | B1 | * | 12/2003 | Kornrumpf et al. ............ 29/622 |
| 2002/0138109 | A1 | * | 9/2002 | Keogh et al. ....................... 607/9 |
| 2003/0050663 | A1 | * | 3/2003 | Khachin et al. ............... 606/200 |

FOREIGN PATENT DOCUMENTS

| FR | 2786678 A1 | * | 12/1998 |
| JP | 59115164 A | * | 12/1982 |
| JP | 60242813 A | * | 5/1984 |

* cited by examiner

*Primary Examiner* — Stephen Choi

(57) ABSTRACT

A spoon having: a handle portion; and a head portion connected to the handle portion, the head portion being at least partially fabricated from a shape memory material, the head having a first shape to hold a liquid when the temperature of the liquid is less then a predetermined threshold temperature and a second shape so as to not hold the liquid when the temperature of the liquid is greater than the predetermined threshold. The first shape is preferably a concave shape and the second shape is a substantially flat shape. Alternatively, the first shape is a concave shape and the second shape is a concave shape having at least one opening in the concave shape. A fork is also disclosed having times that change shape when the temperature of food held thereon is greater than a predetermined threshold.

16 Claims, 1 Drawing Sheet

SHAPE MEMORY SAFETY UTENSIL

CROSS REFERENCE TO RELATED APPLICATION

This application claims the benefit of U.S. Provisional Application 60/346,551 filed on Jan. 8, 2002, the entire contents of which is incorporated herein by its reference.

BACKGROUND OF THE INVENTION

1. Field of the Invention

The present invention relates generally to utensils, and more particularly, to a spoon having a concave head for holding a liquid when the temperature of the liquid is less than a predetermined threshold temperature and where the head takes a shape which is unable to hold the liquid when the temperature of the liquid is greater than the predetermined threshold temperature.

2. Prior Art

Many people, especially children and the elderly burn their mouths after eating food that it too hot. For instance, eating soup that is too hot from a soup container often leads to serious burns on the inside of a person's mouth. In order to prevent such occurrences, a person would have to insert a thermometer into the soup to determine its temperature. Additionally, it is known in the art to use a utensil, such as a spoon, which has a built in temperature sensing device, and a means for indicating that the temperature of the food is too hot, such as a caution symbol. However, children and elderly people often cannot or do not recognize such indications.

Therefore, there is a need in the art for a simple passive method and device for preventing people, particularly children and the elderly, from eating food that is too hot and can cause burning of the mouth.

SUMMARY OF THE INVENTION

Therefore it is an object of the present invention to provide a spoon having a passive means for preventing people from eating food that is likely to cause burning of the mouth.

It is another object of the present invention to provide such a spoon in a simple and inexpensive configuration.

Accordingly, a spoon is provided. The spoon comprises: a handle portion; and a head portion connected to the handle portion, the head portion being at least partially fabricated from a shape memory material, the head having a first shape to hold a liquid when the temperature of the liquid is less then a predetermined threshold temperature and a second shape so as to not hold the liquid when the temperature of the liquid is greater than the predetermined threshold.

Preferably, the first shape is a concave shape and the second shape is a substantially flat shape. Alternatively, the first shape is a concave shape and the second shape is a concave shape having at least one opening in the concave shape. In the alternative configuration, the at least one opening is preferably formed by a flap portion of shape memory material, the flap portion forming a portion of the concave shape when the temperature of the fluid is less than the predetermined threshold temperature, the flap portion departing from the concave shape when the temperature of the fluid is greater than the predetermined threshold temperature to form the at least one opening. Preferably, substantially the entire head portion is fabricated from the shape memory material and the flap portion is integral with the head portion. Furthermore, the flap portion is preferably stamped from the head portion. Preferably, the flap portion is fabricated from a shape memory material and is fixed to the head portion. The flap portion is preferably fixed to the head portion by a brazed or welded butt joint.

Preferably, substantially the entire head portion is fabricated from the shape memory material. Still further preferable, the shape memory material exhibits a two-way memory, each memory corresponding to one of the first and second shapes. The shape memory material is preferably a metal. Alternatively, the shape memory material is a plastic.

Preferably, the spoon further comprises a coating disposed over a surface of the head portion. The coating is preferably selected from a group consisting of nickel, chrome, TEFLON (polytetrafluoroethylene), and stainless steel.

Also provided is a method for preventing the holding of a hot liquid in a spoon. The method comprises: permitting the spoon to have a concave shaped head portion for holding the liquid when the temperature of the liquid is below a predetermined threshold temperature; and changing the shape of the head portion when the temperature of the liquid is greater than the predetermined threshold temperature so as to not hold the liquid.

The method preferably further comprises, after the changing step, changing the shape of the head portion back to a shape to hold the liquid when the temperature of the liquid cools to a temperature below the predetermined threshold temperature.

The head portion preferably has a concave shape when the temperature of the liquid is below the predetermined threshold temperature and preferably has a substantially flat shape when the temperature of the liquid is greater than the predetermined threshold temperature.

Alternatively, the head portion has a concave shape when the temperature of the liquid is below the predetermined threshold temperature and has a concave shape having at least one opening in the concave shape when the temperature of the liquid is greater than the predetermined threshold temperature.

Still yet provided is a utensil. The utensil comprises: a handle portion; and a head portion connected to the handle portion, the head portion being at least partially fabricated from a shape memory material, the head having a first shape to hold a liquid or solid food when the temperature of the food is less then a predetermined threshold temperature and a second shape so as to not hold the food when the temperature of the liquid is greater than the predetermined threshold.

Preferably, the head portion is a concave spoon or has a plurality of tines to form a fork.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of utensils, it has been found particularly useful in the environment of spoons. Therefore, without limiting the applicability of the invention to spoons, the invention will be described in such environment. For instance, a fork can also be utilized as the utensil of the present invention. Such a fork can have tines, which deform when above the predetermined transition temperature so as to not hold the food. Such a deformation can be a curling or outward deformation of the tines to eject the food carried thereon when the food is determined to be too hot, i.e., the food is above the predetermined threshold temperature.

Figure 1:
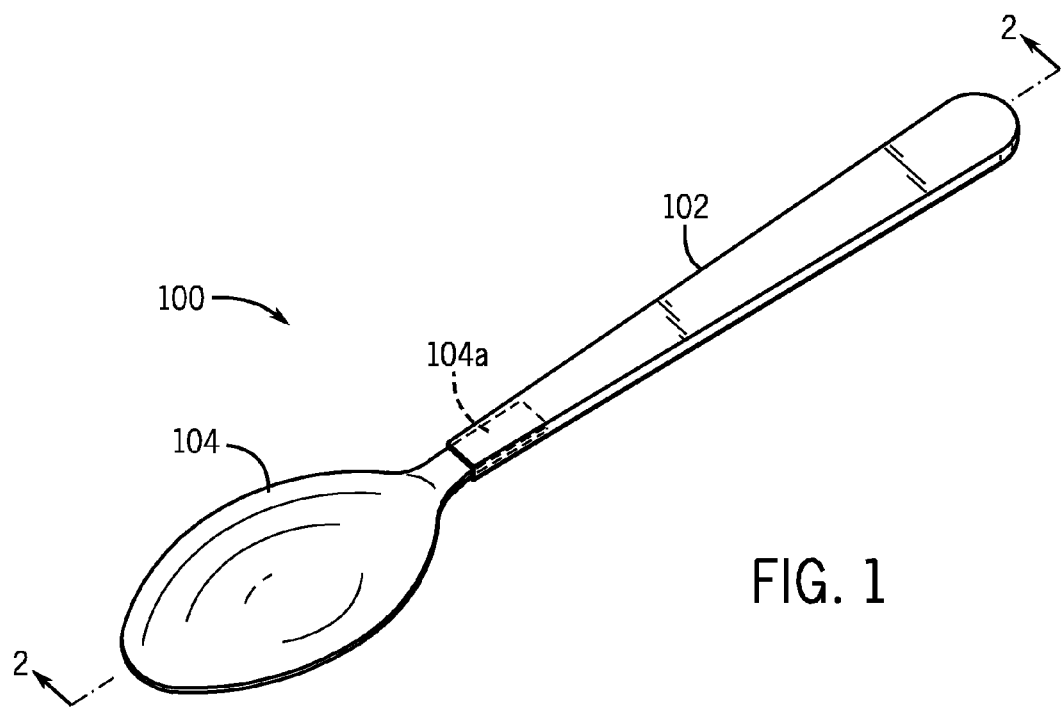
FIG. 1 illustrates a perspective view of a preferred implementation of the spoon of the present invention.

Referring now to FIG. 1, there is illustrated a preferred implementation of a safety spoon of the present invention, generally referred to by reference numeral 100. The spoon 100 comprises a handle portion 102 and a head portion 104 connected to the handle portion 102. The handle portion 102 is preferably a molded plastic material and the head portion 104 is preferably has a tail portion 104a which is insert molded into the handle portion 102 to form a spoon. However, the handle and head portions 102, 104 can be integrally formed of the same material or formed of similar materials and appropriately connected together to form a single piece.

The head portion is at least partially fabricated from a shape memory material, such as a metal or a plastic shape memory material. Although many shape-memory materials may be used, a nickel-titanium alloy (NiTi) is preferred. One such NiTi alloy is manufactured, for example, by Shape Memory Applications, Inc., Santa Clara, Calif. In general, metallic shape-memory alloys, such as NiTi, CuZnAl, and CuAlNi alloys, undergo a transformation in their crystal structure when cooled from the high-temperature austenite form, which is generally stronger, to the low-temperature martensite form, which is weaker. When a shape-memory material is in its martensitic form, it is easily deformed to a new shape. However, when the material is heated through its transformation temperature, it reverts to austenite and recovers its previous shape with great force. The temperature at which the material reverses its high temperature form when heated can be adjusted by slight changes in material composition and through heat treatment. The shape-memory process can be made to occur over a range of a few degrees, if necessary, and the shape transition can be made to occur millions of times. Heating may be effected, for example, by immersing the head portion in a hot liquid, such as soup. The transition temperature is alternatively referred to herein as the threshold temperature that is chosen such that temperatures above the threshold temperature are likely to cause a burning of the mouth.

Some shape-memory materials can be made to exhibit shape-memory only upon heating (one-way shape-memory), or also can undergo a shape change upon cooling (two-way shape memory). Although the head portion, or a portion thereof can be fabricated from a shape memory material having a one-way memory, it is preferred that it have a two-way memory. Shape-memory materials are available in many forms including, for example, wires, rods, ribbons, strips, sheets, and microtubing, and can be used to fabricate shape-memory structures having linear, planar and composite forms.

The head portion has a first shape to hold a liquid when the temperature of the liquid is less then a predetermined threshold temperature and a second shape so as to not hold the liquid when the temperature of the liquid is greater than the predetermined threshold temperature.

Figure 2:
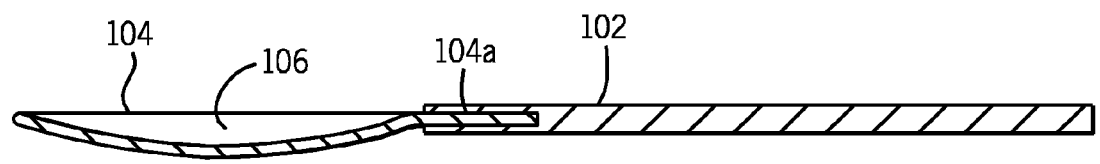
FIG. 2 illustrates a sectional view of the spoon of FIG. 1 taken along line 2-2 where the temperature of the head portion of the spoon is below a predetermined threshold temperature.
Figure 3:
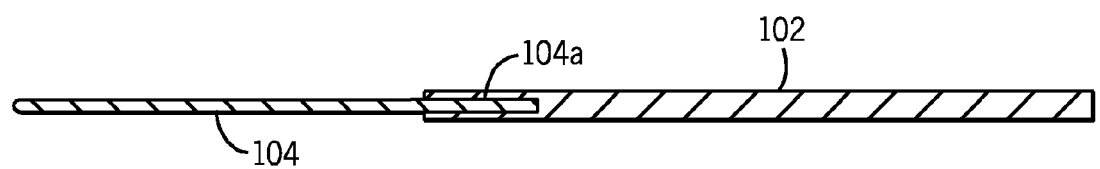
FIG. 3 illustrates a sectional view of a first variation of the spoon of FIG. 1 taken along line 2-2 where the temperature of the head portion of the spoon is greater than the predetermined threshold temperature.

Referring now to FIG. 2 the spoon 100 is shown having a typically shaped head portion 104 having a concavity 106 to hold liquid therein. Referring now to FIG. 3, there is illustrated a first variation of the spoon 100 of the present invention. In the first variation, the first shape is a concave shape as is shown in FIG. 2 and the second shape is a substantially flat shape as is shown in FIG. 3. Those skilled in the art will appreciate that the flat shaped head portion 104 is no longer capable of holding a liquid, therefore liquids that are too hot, i.e., having a temperature greater than the predetermined threshold temperature cannot to held and consumed with the spoon 100. It is preferred that the head portion 104 the spoon 100 has two-way memory such that it returns to the concave shape of FIG. 2 when the head portion 104 cools below the predetermined threshold temperature.

Figure 4:
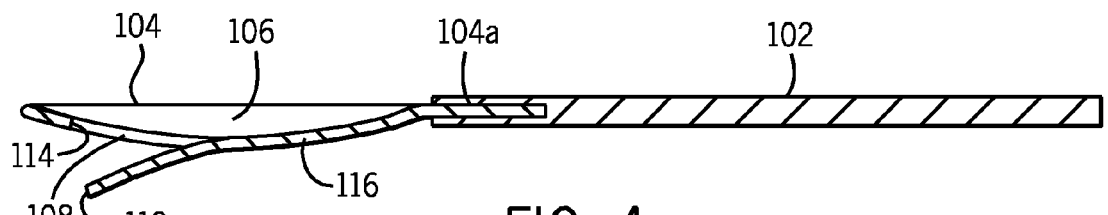
FIG. 4 illustrates a sectional view of an alternative variation of the spoon of FIG. 1 taken along line 2-2 where the temperature of the head portion of the spoon is greater than the predetermined threshold temperature.

Referring now to FIG. 4, there is shown an alternative version of the spoon 100 of the present invention. In the alternative version, the second shape is a concave shape that has at least one opening 108 in the concave shape. Preferably, the head portion 104 retains its concave shape and the at least one opening 108 is formed by a flap portion 110 of shape memory material. The flap portion forms a portion of the concave shape when the temperature of the fluid is less than the predetermined threshold temperature and departs from the concave shape when the temperature of the fluid is greater than the predetermined threshold temperature to form the at least one opening 108. Preferably, the edges 112 of the flap portion 110 and corresponding edges 114 of the opening 108 are beveled to provide a proper fit and a seal. The beveled edges 112, 114 are preferably formed by a secondary operation such as grinding.

The entire head portion 104 can be fabricated of the shape memory alloy or only the flap portion 110 can be fabricated from the shape memory alloy. Where the entire head portion 104 is fabricated of the shape memory alloy, the flap portion 110 is preferably stamped from the head portion 104. Where only the flap portion 110 is fabricated from the shape memory alloy, the opening 108 is stamped or otherwise created in the head portion 104 and the flap portion 110 is fixed to the head portion 104 by a brazed or welded butt joint 116. The butt joint 116 is preferably ground flush with the adjoining portion of the head portion so as to appear seamless.

Preferably, the spoon 100 further comprises a coating disposed over a surface of the head portion 104. The coating is any coating known in the art, such as nickel, chrome, TEFLON (polytetrafluoroethylene), and stainless steel.

As discussed above, the utensil is not limited to a spoon. The spoon is given by way of example only and not to limit the scope or spirit of the present invention. For instance, the utensil of the present can be a fork having a head portion having a first shape to hold a solid food when the temperature of the food is less then a predetermined threshold temperature and a second shape so as to not hold the food when the temperature of the liquid is greater than the predetermined threshold. For instance, the tines of the fork can have a second shape, which expels the food captured thereon from the fork when the temperature of the food is over the predetermined threshold temperature and thereby prevents the food from being eaten. For instance, the tines can roll up or they can extend outwardly away from the axial axis of the fork. Of course, those skilled in the art will appreciate that many other second shape configurations are possible.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A spoon for holding a liquid food, the spoon comprising:
    a handle portion; and
    a head portion connected to the handle portion, the head portion being at least partially fabricated from a shape memory material, the head having a first shape to hold the liquid food when the temperature of the liquid food is less than a predetermined threshold temperature and a second shape so as to not hold the liquid food when the temperature of the liquid food is greater than the predetermined threshold.

2. The spoon of claim 1, wherein the first shape is a concave shape and the second shape is a substantially flat shape.

3. The spoon of claim 1, wherein the first shape is a concave shape and the second shape is a concave shape having at least one opening in the concave shape.

4. The spoon of claim 3, wherein the at least one opening is formed by a flap portion of shape memory material, the flap portion forming a portion of the concave shape when the temperature of the fluid is less than the predetermined threshold temperature, the flap portion departing from the concave shape when the temperature of the fluid is greater than the predetermined threshold temperature to form the at least one opening.

5. The spoon of claim 4, wherein substantially the entire head portion is fabricated from the shape memory material and the flap portion is integral with the head portion.

6. The spoon of claim 5, wherein the flap portion is stamped from the head portion.

7. The spoon of claim 4, wherein the flap portion is fabricated from a shape memory material and is fixed to the head portion.

8. The spoon of claim 7, wherein the flap portion is fixed to the head portion by a brazed or welded butt joint.

9. The spoon of claim 1, wherein substantially the entire head portion is fabricated from the shape memory material.

10. The spoon of claim 1, wherein the shape memory material exhibits a two-way memory, each memory corresponding to one of the first and second shapes.

11. The spoon of claim 1, wherein the shape memory material is a metal.

12. The spoon of claim 1, wherein the shape memory material is a plastic.

13. The spoon of claim 1, further comprising a coating disposed over a surface of the head portion.

14. The spoon of claim 13, wherein the coating is selected from a group consisting of nickel, chrome, polytetrafluoroethylene, and stainless steel.

15. A utensil for holding a liquid, the utensil comprising:
    a handle portion; and
    a head portion connected to the handle portion, the head portion being at least partially fabricated from a shape memory material, the head having a first shape to hold the liquid when the temperature of the liquid is less than a predetermined threshold temperature and a second shape so as to not hold the liquid when the temperature of the liquid is greater than the predetermined threshold.

16. The utensil of claim 15, wherein the head portion is a concave spoon.

* * * * *